(No Model.)
E. WESTON.
VOLTAIC CELL.
No. 494,827. Patented Apr. 4, 1893.
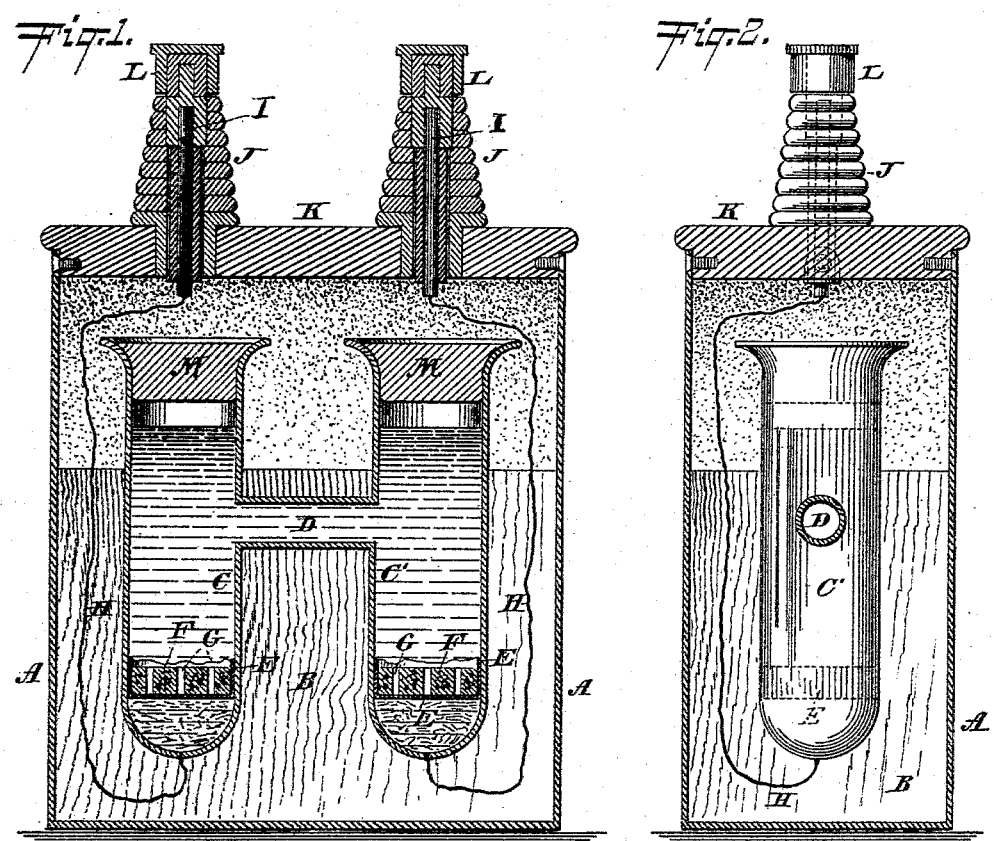
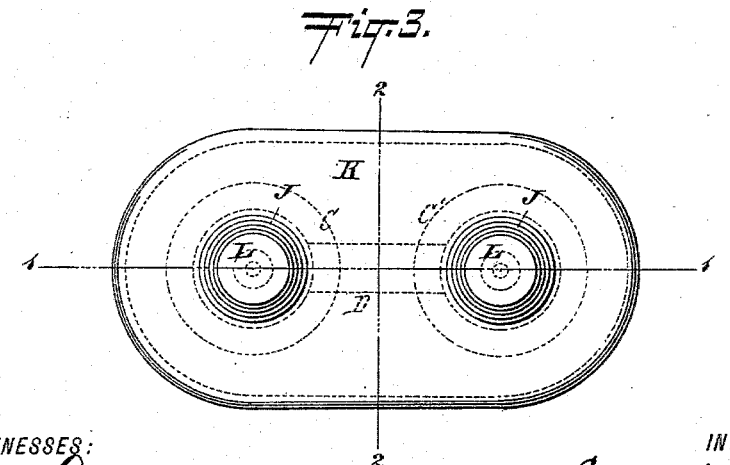
WITNESSES:
Gustavch Dieterich.
M. Bosch.
INVENTOR
Edward Weston
BY Park Benjamin
his ATTORNEY.

UNITED STATES PATENT OFFICE.

EDWARD WESTON, OF NEWARK, NEW JERSEY.

VOLTAIC CELL.

SPECIFICATION forming part of Letters Patent No. 494,827, dated April 4, 1893.

Application filed November 24, 1891. Serial No. 412,938. (No model.)

*To all whom it may concern:*

Be it known that I, EDWARD WESTON, of Newark, Essex, county New Jersey, have invented a new and useful Voltaic Cell, of which the following is a specification.

I have discovered a voltaic cell, the temperature coefficient of which is practically invariable; in other words, a cell which is free from temperature error, or in which the electromotive force does not depend upon the temperature of the cell. Such a cell has hitherto been unknown in the art. While a cell of this character may be applied to various uses, it will find its principal employment and be of the highest utility as a standard of measurement of electromotive force. There is, at the present time, no absolute standard of the unit of electromotive force, (the volt) but there is a variety of cells termed "standards" with which comparisons are made. In all of these cells, the effect of change of temperature is to change the value of the electromotive force. In the improved Clark standard cell, for example, which contains amalgamated platinum wire and a rod of pure zinc as elements, embedded in a paste of pure mercurous sulphate and a saturated solution of pure zinc sulphate, the effect of change of temperature is to change the value of the electromotive force about .077 per degree centigrade. It will be apparent that such a cell cannot be called a "standard" cell in any proper sense of the term, inasmuch as its indications depend, first, upon constantly varying temperatures, and second, upon the recognition of these variations through some other device; as for example, a thermometer, which in turn becomes the standard.

In cells containing a sulphate of zinc solution, the density of the solution is dependent upon the temperature of the solvent (water) in which the zinc salt is dissolved; and with every change of density, there is a corresponding change of electromotive force; the latter rising to a marked extent as density diminishes. Furthermore, in all so-called standard cells, there is a deposition on the zinc of something, which, like the copper in the Daniel cell, does not protect the zinc, but enters into local action with it, thus affecting the relation of one electrode to the other. It will be apparent, therefore, that in order to adapt my discovery to the purposes of a standard cell, I must not only devise a cell in which the value of the electromotive force does not change with temperature, but also one which contains such substances as will not cause local action to affect the electromotive force.

I have discovered that the electromotive force of all cadmium salts is practically independent of temperature changes. This appears to be due to the fact that such salts are equally as soluble in hot as in cold water; the density of the solution remaining substantially the same, so that there is no disturbance of electromotive force due to changes in density. The chemical affinities in the cell are substantially the same, no matter what the temperature of the cell may be within reasonable limits; and in fact, we have the very remarkable condition of the action of chemical affinities being practically unhelped by heat. Any salt of cadmium may be used, the acid of which forms a practically insoluble compound with mercury when the salt is in the state of a saturated solution in water, or in a solution of the salt of cadmium employed. Such salts, for example, are the sulphate, the chloride, the bromide and the iodide. I may use a single salt or I may use combinations of these various salts with any insoluble salt and mercury. The ingredients of the cell will depend upon the use to which it is to be put. If, for example, it is to be employed as an absolute standard, then it should be so made as to be absolutely permanent; and in such condition, it may be supplied to the market as a completed article of manufacture; or the cells may be put together by the user and intended only for an hour or two's employment. In that case, it is immaterial if the compounds become impaired in efficiency at the end of that time, since they may be thrown aside and be replaced on the next occasion for use.

I may arrange the ingredients of the cell in either of three ways. First, I may use an electrolyte composed of a saturated solution of cadmium salt with electrodes of other material. Second, I may use an electrode containing cadmium opposed to an electrode of mercury and an electrolyte of material other than cadmium salt. Third, and this is the best arrangement for an absolute standard cell, which I now know, I may use as an electrolyte a saturated solution of cadmium salt in water, and as electrodes an amalgam of cadmium and mercury opposed to an electrode of pure mercury and proto-sulphate of mercury.

Thus, to illustrate case one, I may substitute a solution of cadmium sulphate for the mercurous sulphate and saturated solution of pure zinc sulphate employed in the Clark cell; the electrodes being zinc and amalgamated platinum. In such event, however, while the cell on first construction will show much less variation of electromotive force dependent upon change of temperature than does the Clark cell, nevertheless, in time its error will approach that of the Clark cell, because by the reduction of the mercury salts, the solution becomes more and more near to the sulphate of zinc, or Clark's cell.

Under the second case, I may employ electrodes such as described in case three with a saturated solution of zinc sulphate. Here, while the change in electromotive force due to variation in temperature will be less than is common in standard cells, still the best conditions for an efficient cell will not be realized.

The construction described in case three is, as I have stated, the best means which I now know for carrying the discovery into practical effect, both broadly and generically, and specifically in the form of a standard cell. I have already stated that such a cell must not only be independent of temperature changes and free from local action, but it must also be free from what may be termed differential action dependent upon the difference in the conditions surrounding or affecting the electrodes. To illustrate my meaning in this last statement, if a cell be composed of two zinc electrodes, both immersed in a solution of zinc sulphate, and one electrode be heated more than another, there will be a current and the equilibrium will be disturbed. Or if two zinc electrodes, each chemically pure, be immersed in separate solutions of zinc sulphate, one of which is more dense or stronger than the other, again the equilibrium will be disturbed, and there will be a difference of potential between the terminals of the cell. Now, with a cell composed as before stated of electrodes respectively of an amalgam of cadmium and mercury and of pure mercury and sulphate of mercury with a saturated solution of a cadmium salt as an electrolyte, there will be, first, no variation of electromotive force due to changes of temperature; second, no disturbing currents due to local action; third, no potential differences due to greater or less density of solution as affecting one electrode or the other, or to differences of temperature of one electrode or the other. In stating that these effects are totally absent, I do not wish to be understood as asserting that fact with mathematical precision, but in the sense that the cell shows no disturbance from these causes within all reasonable and practicable limits. This I have determined by the most delicate electrical tests known in the art. I have, for example, submitted the cell to temperature changes over a range of 200° Fahrenheit, under which conditions I have been unable to detect a variation of electromotive force in excess of one one-hundredth of one per cent.

In order to adapt my discovery to practical use as a standard cell, I have embodied it in the construction which is represented in the annexed drawings, Figures 1, 2, 3, wherein similar letters of reference indicate like parts.

Fig. 1 is a vertical section on the line 1. 1. of Fig. 3. Fig. 2 is a vertical section on the line 2. 2. of Fig. 3. Fig. 3 is a top view.

A is an outer shell or casing made preferably of sheet brass and elliptical in form. In the bottom of this shell is inserted a wooden block B containing cavities or recesses to receive the glass cells C. C'. The said glass cells consist of two cylindrical vessels C, C' connected by a transverse tube D. The lower ends of the said vessels are rounded and their mouths are flared, as shown. Within one vessel, as C, I place an amalgam of cadmium and mercury. In the other vessel, I place a mixture of pure mercury and proto-sulphate of mercury. I then insert in each vessel above the electrode, a piece of muslin or other suitable cloth E, the edges of which turn upward. In the cup-shaped piece of cloth thus introduced, I insert a cork F pierced with apertures G. This arrangement of cork and muslin serves to hold the materials of the electrodes in place and prevent their becoming commingled with the solution when the cell is moved about. At the same time, the openings in the corks F allow of free contact of the solution with the electrodes. I then place in each cell C C', a saturated solution of cadmium sulphate. Lastly, I insert in the mouths of the cell suitable stoppers M and secure them in place with cement. The connecting wires H pass through the bottoms of the cells C C' and communicate electrically with the electrodes. They are connected to copper wires I, which are received in suitable binding posts J. These binding posts J are carried by the cover K of the shell A, which cover is made of rubber. The binding posts J are provided with covering caps L, as shown. After the cells are in place, the space in the shell A above the block B is filled up with a composition preferably composed of beeswax, rosin and linseed oil. The cover K is then adjusted and the cell permanently closed. The electromotive force of the elements described approximates 1.019 volt.

I claim—

1. A voltaic cell the electromotive force of which is practically independent of temperature changes, substantially as and for the purposes set forth.

2. In a voltaic cell, an electrolyte, the density of which is practically independent of temperature changes, substantially as and for the purposes set forth.

3. In a voltaic cell, an electrode containing a substance, the electromotive force of which is practically independent of temperature changes, substantially as and for the purposes set forth.

4. In a voltaic cell an electrolyte containing a substance the electro motive force of which is practically independent of temperature changes, substantially as and for the purposes set forth.

5. In a voltaic cell an electrolyte and an electrode, each containing a substance the electro-motive force of which is practically independent of temperature changes, substantially as and for the purposes set forth.

6. In a voltaic cell, an electrolyte containing in solution a metallic salt the electro-motive force of which is practically independent of temperature changes, substantially as and for the purposes set forth.

7. In a voltaic cell, an electrode containing a metal the electromotive force of the salts of which is practically independent of temperature changes, substantially as and for the purposes set forth.

8. In a voltaic cell, an electrode and an electrolyte, the first containing a metal and the second a metallic salt, of which salt and of the salts of which metal the electro motive force is practically independent of temperature changes, substantially as and for the purposes set forth.

9. In a voltaic cell, containing an electrolyte, an electrode of an amalgam of cadmium and mercury and an electrode of mercury and protosulphate of mercury.

10. In a voltaic cell, an electrode of an amalgam of cadmium and mercury, an electrode of mercury and protosulphate of mercury, and an electrolyte containing cadmium sulphate.

11. The combination, in a voltaic cell, containing two electrodes and an electrolyte of a vessel C containing, in its lower portion, an electrode in a pasty or viscid form, and a liquid electrolyte, and above said electrode a perforated partition F of non-conducting material.

12. The combination, in a voltaic cell, containing two electrodes and an electrolyte of a vessel C containing in its lower portion an electrode in pasty or viscid form, and a liquid electrolyte, and above said electrode a partition E of cloth or equivalent flexible material, and a perforated partition F of non-conducting material.

13. The combination of the vessels C C' having the intermediate connecting tube D, a socket for the reception of said vessels, and an inclosing shell A; the said vessels being embedded in said socket in said shell, and the said shell above said socket being filled with cement or equivalent material.

EDWARD WESTON.

Witnesses:
R. C. FESSENDEN,
M. BOSCH.